July 6, 1965 H. FRANK 3,193,834
APPARATUS FOR RECORDING OPERATIONS OF A MACHINE
Filed Oct. 19, 1962 2 Sheets-Sheet 1

INVENTOR
Hermann Frank by Michael S. Striker
Atty

United States Patent Office 3,193,834
Patented July 6, 1965

3,193,834
APPARATUS FOR RECORDING OPERATIONS OF A MACHINE
Hermann Frank, Villingen, Germany, assignor to Kienzle Apparate G.m.b.H., Villingen, Black Forest, Germany
Filed Oct. 19, 1962, Ser. No. 231,802
Claims priority, application Germany, Oct. 20, 1961, K 44,974
10 Claims. (Cl. 346—62)

The present invention relates to an apparatus for recording operations of a machine, and more particularly to recording apparatus by which a graph is recorded which indicates the number of pieces produced by the machine, the number of operations carried out by the machine, and similar operational conditions. In this manner, it can be checked whether or not the machine was efficiently used by the operator.

It is known to register the time during which the machine is actually operated, for example, a switch may be closed when the machine is started or stopped, so that the working time of the machine is recorded on a record carrier.

It has also been proposed to provide a number of switches which are selectively actuated by the operator of the machine, and which cause a different thickness of the recorded graph.

Recording apparatus is also known in which a recorded line represents 1, 10 or 100 operations of the machine, or pieces produced by the machine.

However, known recording apparatus does not permit the recording of a graph which not only indicates the number of pieces produced, or the number of operations of the machine, but also the time of every interruption of the work of the machine, and the reasons for such interruptions such as specific undesirable operational conditions. However, this is just as necessary for recording apparatus indicating the number of pieces produced, as for recording apparatus recording only the time periods during which the machine was in operation. The reasons causing an interruption of the operation of the machine are important, irrespective of the manner in which the productivity of the machine is evaluated, which may be by a statistical interpretation of the number of pieces produced by the machine.

It is one object of the invention to provide an apparatus for recording continuously the number of produced pieces as of operations of the machine, and for also recording at times selected by the operator, certain operational conditions of the machine.

A related object of the present invention is to provide recording apparatus which counts and records the operations of the machine, and also capable of recording, under control of the operator, those different conditions which cause the operator to stop the machine.

Another object of the present invention is to provide apparatus for recording a graph which indicates the time periods during which the machine is in operation, the number of pieces produced by the machine during such time periods, conditions which cause the operator to stop the machine, and time periods during which the machine is at a standstill. Another object of the present invention is to record a graph which has a characteristic appearance when recording the number of normal operations of the machine, and can be given a different characteristic appearance when indicating different operational conditions causing stoppage of the machine.

Another object of the invention is to provide an apparatus for recording the number of normal operations of the machine under control of the machine, and for recording specific undesirable conditions under control of the operator.

With these objects in view, one embodiment of the present invention relates to an apparatus for recording the number of operations of a machine, such as the number of pieces produced. One embodiment of the apparatus comprises recording means for recording on a moving record carrier which may be driven by clockwork; operating means controlled by the machine and operatively connected to the recording means so that the same are actuated during the operation of the machine to produce a record of repeated operations on the record carrier; and manually operable means connected to the recording means and controlling the same to effect identifiable and distinguishable recordings. In this manner, the operator can cause changes in the record on the record carrier representing different conditions causing stopping of the machine, and can be interpreted. During recording of such distinguishable recordings the operating means no longer produce a record of the number of machine operations and the record only indicates the reason of the stopped condition of the machine.

In the preferred embodiment of the invention, an electromagnetic means is operatively connected to the recording means for shifting the same in such a manner as to effect a change in the record. A plurality of manually controlled switches, are provided for actuating the control means in accordance. Cyclically operated means, such as control switches, connect the manually controlled switches at different frequencies with the electromagnetic means so that the thus made recordings are identifiable and distinguishable and indicate the time of actuation of the manually controlled switches, and the nature of the condition which may have caused stopping of the machine by the operator.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawings, in which:

Figure 1:
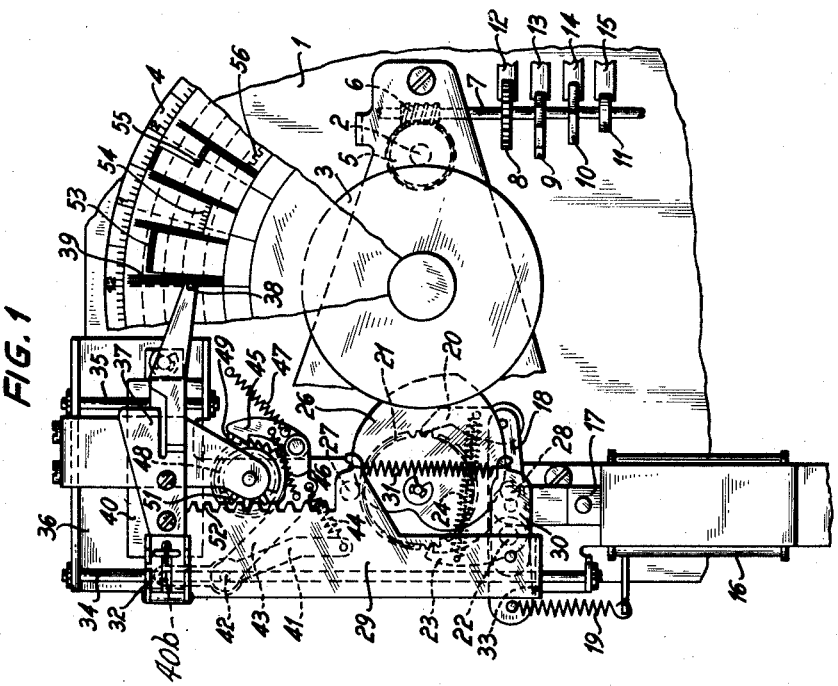
FIG. 1 is a fragmentary plan view of the apparatus according to one embodiment of the invention.
Figure 2:
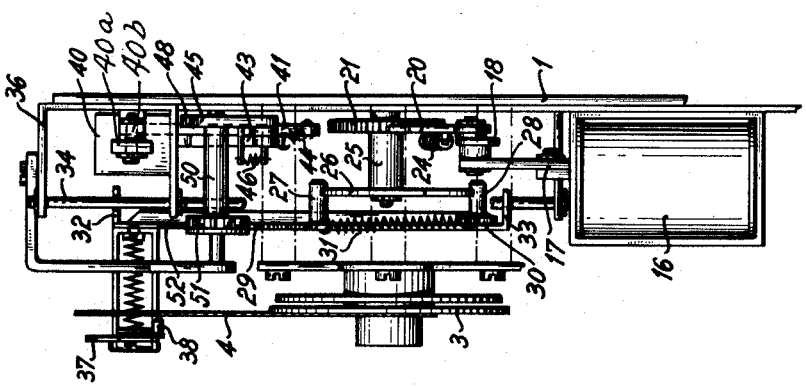
FIG. 2 is a side elevation of the embodiment shown in FIG. 1.
Figure 3:
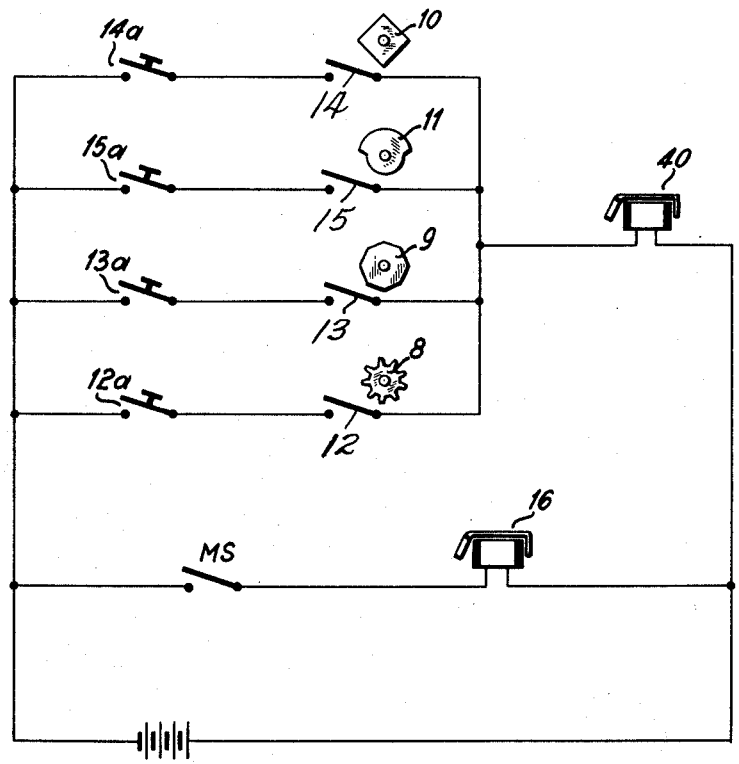
FIG. 3 is a switching diagram.

Referring now to the drawings, a bottom plate 1 supports a synchronous motor, not shown, which drives a shaft 7 at constant rotary speed. Shaft 7 drives a rotary support 3 through a worm gear reduction transmission including gears 6, 5 and a shaft 2, so that a record carrier 4, shown to be a circular diagram sheet, is rotated at constant speed. Shaft 7 carries fixed thereon a set of cam discs 8, 9, 10, 11 cooperating with micro switches 12, 13, 14, 15. Since cams 8 to 11 have different numbers of projections, switches 12 to 15 are cylically operated at different frequencies.

Each of control switches 12 to 15 is connected in series with a manually operated switch 12a to 15a, respectively. An electromagnetic means 40 is connected in series with switches 12, 13, 14, 15, so that electromagnetic means 40 is energized whenever one of the switches 12 to 15 is closed while the corresponding manually operated switch is also closed by the operator. Consequently, the energization of electromagnetic means 40 can only take place under control of the operator.

Another electromagnetic means 16 is mounted on the plate 1, and is electrically connected to the machine whose production and operation is to be recorded. Whenever one piece, or every tenth or twenty-fifth piece is produced by the machine, the machine closes a switch MS thereby producing an impulse passing through electromagnetic means 16 and energizing the same. United States Patent 892,292, for instance, shows a machine controlling a switch for a recording instrument. Whenever electromagnetic means 16 is energized by a counting impulse received from the machine, the armature 17 is shifted together with a lever 18 connected thereto and mounted on a pivot 22. One arm of lever 18 is biased by spring 19, and the other arm of lever 18 is retracted by the armature 17 against the action of spring 19 whenever electromagnetic means 16 is energized. Retraction of lever 18 causes retraction of pawl 20 mounted on lever 18, and when the impulse is terminated, and electromagnetic means 16 deenergized, spring 19 effects a rocking motion of lever 18 with pawl 20 so that a ratchet wheel 21 is shifted by pawl 20. Another stop pawl 23 is mounted on the pivot 22 of lever 18 and is connected with pawl 20 by a spring 24. Stop pawl 23 checks the movement of the ratchet wheel 21.

Ratchet wheel 21 is connected by a sleeve 25 to a heart-shaped cam member 26, and turns with the same about a shaft, not shown, passing through sleeve 25. The periphery of the heart-shaped cam member 26 is engaged on opposite sides by two rollers 27 and 28. Roller 27 is directly mounted on a pivot secured to a slide 29, while roller 28 is mounted on a lever 30 pivotally mounted on slide 29, and biased by spring 31 to move to a position in which roller 28 resiliently contacts the heart-shaped cam member 26. Slide 29 has slide means 32 and 33 slidingly engaging a pair of guide rods 34 and 35 which are mounted on brackets 36 secured to the base plate 1.

Whenever ratchet wheel 21 is turned a step by pawl 20 under control of the energized electromagnetic means 16, the heart-shaped cam member 26 is turned a corresponding step and acts through rollers 27 and 28 on slide 29 to shift the same. During a complete revolution of the heart-shaped cam 26, the slide 29 moves first in one direction, and then in the opposite direction to perform a reciprocating movement.

A recording member 37 with a recording stylus 38 is mounted on one end of slide 29. Recording member 37 is turnable about an axis extending parallel to the plane of the record carrier sheet 4, so that the recording member can be turned out of the way when a new record carrier sheet is to be mounted on the record carrier support 3. During the reciprocating movement of slide 29, however, recording member 37, 38 is rigidly connected to slide 29 so that stylus 38 makes reciprocating motions in radial direction of the record carrier 4 which appear as a zig-zag line 39 since the record carrier sheet 4 turns about its center.

As explained above, one step of the ratchet wheel 21 with the heart-shaped cam 26 may correspond to 1, 10 or 25 pieces made by the machine, and one radial section of graph 39, which is produced during half the revolution of the heart-shaped cam 26, may correspond to 10, 100 or 1000 pieces made by the machine. For example, each step of the heart-shaped cam 26 produced by electromagnetic means 16 may cause a movement of stylus 38 in radial direction a distance which is one-fifth or one-tenth of the radial extension of the graph 39.

Graph 39 can be easily evaluated to determine the number of pieces, or similar operations, of the machine produced during a time period apparent from a circular time scale on record carrier sheet 4.

As explained above, electromagnetic means 40 is controlled by the cyclically operated control elements 12 and 15 and by the operator influenced means 12a to 15a. Electromagnetic means 40 is mounted on the supporting plate 1, and has an armature 40a pivotally connected by a pin 40b to one arm of a double-armed lever 41 which is mounted on a fixed pivot means 42 so that lever 41 is rocked in clockwise direction whenever electromagnetic means 40 is energized. Another lever 43 is connected by spring 44 with the other arm of lever 41, and is also mounted on pivot means 42. A small pawl 45 is mounted on lever 43 and is connected by a spring 46 with lever 43. Pawl 45 is also biased by a spring 47 secured to the base plate.

When electromagnetic means 40 is not energized, spring 47 pulls pawl 45 to an inoperative position spaced from a gear or ratchet wheel 48 and abutting a stop 49.

When electromagnetic means 40 is energized, lever 41 is turned in clockwise direction, so that lever 43 is turned through spring 44 whereby pawl 45 is actuated through spring 46 to shift the ratchet wheel 48 one step. Ratchet wheel 48 is connected by a collar 50 with a gear 51 meshing with a toothed rack on slide 29. Consequently, whenever electromagnetic means 40 is energized, gear 51 is turned one step, and slide 29 is shifted one step. Such shifting of the slide 29 with recording member 37, 38, is not obstructed by the heart-shaped cam member 26 since roller 28 is mounted on the spring-loaded lever 30, which resiliently gives when slide 29 is shifted with lever 30. When electromagnetic means 40 is again de-energized, spring 47 pulls pawl 45 away from ratchet 48, so that spring 31 pulls slide 29 back to its initial position.

The radial movement of stylus 38 caused by electromagnetic means 40 is small and corresponds to the radial extension of the recorded graphs 53, 54, 55, and 56.

During operation of the machine, electromagnetic means 16 is energized when a certain number of pieces has been produced, and effects a stepwise turning of the heart-shaped cam member 26 so that slide 29 moves in one direction as long as one-half of the heart-shaped cam 26 is operative and moves in the opposite direction when the other half of the heart-shaped cam 26 is operative. In this manner, the zig-zag graph 39 is produced on the record sheet 4. The total length of graph 39 indicates the number of pieces produced by the machine in a certain time.

Certain conditions may necessitate the stopping of the machine. In the illustrated embodiment, it is assumed that four different conditions may cause the operator to stop the machine. In the illustrated embodiment, the four control elements 12 to 15, and the four manually controlled switches 12a to 15a are respectively associated with these conditions. For example, when a first condition necessitating the stopping of the machine arises, the operator actuates switch 12a. However, electromagnetic means 40 is not continuously closed as long as switch 12a is closed, since control switch 12 interrupts the circuit unless closed by one of the projections of cam 8. Cam 8 has a certain number of cam projections, so that during each revolution of shaft 7, control switch 12 is closed a certain number of times. Cams 9, 10 and 11 have different numbers of cam projections so that switches 13, 14 and 15 are closed at a different frequency. Whenever switch 12 is closed while switch 12a is closed by the operator, the electromagnetic means 40 is energized, and effects a short radial movement of slide 29 with recording member 37, 38, and when switch 12 is released by a cam projection of cam 8, electromagnetic means 40 is de-energized, and slide 29 is again retracted to its initial position so that one of the graphs 53 to 56 is made. Graph 56 shows comparatively few reciprocations within unit time, corresponding to a small number of cam projections on the corresponding cam 11. Graph 55 was made under control of a cam having a greater number of cam projections, while graph 53 was made under control of a cam having a very great number of cam projections so that the zig-zig recording 53 appears as a solid dark line on the record carrier sheet.

The circumferential length of the recordings 53, 54, 55 and 56 indicates the duration of the stoppage of the machine, and as soon as the machine is started again, and electromagnetic means 16 is energized, circuit means including relays operate holding contacts (not shown) of switches 12a to 15a to open all switches so that a graph 39 is again produced under control of the machine and electromagnetic means 16 to represent the number, time and duration of repeated machine operations.

It will be understood that each of the elements described above, or two or more together, may also find a useful application in other types of recording apparatus differing from the types described above.

While the invention has been illustrated and described as embodied in a recording apparatus recording conditions causing the operator to stop the machine controlling the recording apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications within the scope of the following claims.

What is claimed as new and desired to be secured by Letters Patent is:

1. Apparatus for recording operations of a machine, comprising, in combination, recording means for recording on a moving record carrier; operating means including first ratchet means operatively connected to said recording means for actuating the same to produce a record on the record carrier representing machine operations, said first ratchet means having a first pawl, and a first electromagnetic means adapted to be energized under control of the machine and operatively connected to said first pawl for actuating said ratchet means and recording means; control means including second ratchet means operatively connected to said recording means for actuating the same to produce identifiable and distinguishable changes in said record, said second ratchet means having a second pawl, and a second electromagnetic means operatively connected to said second pawl for actuating said second ratchet means and recording means, said control means including a set of rotary cam means having different numbers of projections and a set of control switches respectively cyclically closed by said projections of said cam means, each control switch being connected into the circuit of said second electromagnetic means; and a set of selectively manually operable switches respectively connected in series with said control switches so that said second electromagnetic means is energized when any selected manually operable switch and the corresponding control switch are closed.

2. Apparatus for recording operations of a machine, comprising, in combination, recording means including a slide and a recording member mounted on said slide for recording on a moving record carrier; operating means including first ratchet means, a heart-shaped member driven by said first ratchet means, and roller means cooperating with said heart-shaped member and connected to said slide for actuating said recording member to produce a record on the record carrier representing machine operations, said first ratchet means having a first pawl, and a first electromagnetic means adapted to be energized under control of the machine and operatively connected to said first pawl for actuating said ratchet means and recording means; control means including second ratchet means operatively connected to said slide for actuating said recording member to produce identifiable and distinguishable changes in said record, said second ratchet means having a second pawl, and a second electromagnetic means operatively connected to said second pawl for actuating said second ratchet means and recording means, said control means including a set of rotary cam means having different numbers of projections and a set of control switches respectively cyclically closed by said projections of said cam means, each control switch being connected into the circuit of said second electromagnetic means; and a set of selectively manually operable switches associated with different operational conditions and respectively connected in series with said control switches so that said second electromagnetic means is energized when any selected manually operable switch and the corresponding control switch are closed.

3. Apparatus for recording operations of a machine, comprising, in combination, recording means including a slide and a recording member mounted on said slide for recording on a moving record carrier; operating means including first ratchet means, a heart-shaped member driven by said first ratchet means, and roller means cooperating with said heart-shaped member and connected to said slide for actuating said recording member to produce a record on the record carrier representing machine operations, said roller means including a first roller directly mounted on said slide and adapted to engage one side of said heart-shaped member, and a second roller adapted to engage the other side of said heart-shaped member, said operating means further including a lever mounted on said slide and supporting said second roller, and resilient means biasing said lever so that said second roller resiliently engages said heart-shaped member, said first ratchet means having a first pawl, and a first electromagnetic means adapted to be energized under control of the machine and operatively connected to said first pawl for actuating said ratchet means and said slide means; control means including second ratchet means operatively connected to said slide for actuating said recording member to produce identifiable and distinguishable changes in said record while said lever with said second roller is deflected, said second ratchet means having a second pawl, and a second electromagnetic means operatively connected to said second pawl for actuating said second ratchet means and recording means, said control means including a set of rotary cam means having different numbers of projections and a set of control switches respectively cylically closed by said projections of said cam means, each control switch being connected into the circuit of said second electromagnetic means; and a set of selectively manually operable switches associated with different operational conditions and respectively connected in series with said control switches so that said second electromagnetic means is energized when any selected manually operable switch and the corresponding control switch are closed.

4. An apparatus as set forth in claim 3 wherein said slide has a toothed rack, and is spring-loaded to move in one direction, a gear driven by said second ratchet means and meshing with said rack to move the same in the opposite direction whenever said second electromagnetic means is energized so that upon deenergizing of said second electromagnetic means said slide is returned in said one direction.

5. In an apparatus for recording repeated operations of a machine, in combination, means for moving a record carrier sheet; recording means including a stylus for recording on the moving record carrier sheet; operating means adapted to be actuated under the control of the machine upon each machine operation and being connected with said recording means for moving said stylus so as to produce a record on the record carrier sheet representing the number of machine operations; control means connected to said recording means for actuating the same and including a set of control elements individually operable for producing distinguishable recordings; and a set of selectively manually operable means respectively connected with said control elements for actuating the same so that the recordings made to represent the number of machine operations is interrupted by distinguishable recordings upon actuation of selected manually operable means.

6. In an apparatus for recording repeated operations of a machine, in combination, means for moving a record carrier sheet at a uniform speed; recording means including a stylus for recording on the moving record carrier sheet; operating means adapted to be actuated under the control of the machine upon each machine operation and being connected with said recording means for moving said stylus stepwise so as to produce a record on the record carrier sheet representing the number of machine operations; control means connected to said recording means for actuating the same and including a set of control elements individually operable for producing distinguishable recordings, and independent drive means for operating said control elements; and a set of selectively manually operable means respectively connected with said control elements for actuating the same so that the recording made to represent the number of machine operations is interrupted by distinguishable recordings upon actuation of selected manually operable means.

7. In an apparatus for recording repeated operations of a machine, in combination, means for moving a record carrier sheet; recording means including a stylus for recording on the moving record carrier sheet; operating means including electromagnetic means adapted to be energized under the control of the machine upon each machine operation, and a mechanism connected with said recording means and operated by said electromagnetic means for stepwise moving said stylus so as to produce a record on the record carrier sheet representing the number of machine operations; control means connected to said recording means for actuating the same and including a set of control elements individually operable for producing distinguishable recordings; and a set of selectively manually operable means respectively connected with said control elements for actuating the same so that the recording made to represent the number of machine operations is interrupted by dishinguishable recordings upon actuation of selected manually operable means.

8. In an apparatus for recording repeated operations of a machine, in combination, means for moving a record carrier sheet; recording means including a stylus for recording on the moving record carrier sheet; operating means including electromagnetic means adapted to be energized under the control of the machine upon each machine operation, and a ratchet wheel connected with said recording means and a ratchet pawl operated by said electromagnetic means for stepwise moving said ratchet wheel and said stylus so as to produce a record on the record carrier sheet representing the number of machine operations; control means connected to said recording means for actuating the same and including a set of control elements individually operable for producing distinguishable recordings; and a set of selectively manually operable means respectively connected with said control elements for actuating the same so that the recording made to represent the number of machine operations is interrupted by distinguishable recordings upon actuation of selected manually operable means.

9. In an apparatus for recording repeated operations of a machine, in combination, means for moving a record carrier sheet; recording means including a stylus for recording on the moving record carrier sheet; operating means including electromagnetic means adapted to be energized under the control of the machine upon each machine operation, and a mechanism connected with said recording means and operated by said electromagnetic means for stepwise moving said stylus so as to produce a record on the record carrier sheet representing the number of machine operations, said mechanism including a ratchet means operated by said electromagnetic means, a cam stepwise rotated by said ratchet means, and cam follower means cooperating with said cam and connected with said recording means; control means connected to said recording means for actuating the same and including a set of control elements individually operable for producing distinguishable recordings; and a set of selectively manually operable means respectively connected with said control elements for actuating the same so that the recording made to represent the number of machine operations is interrupted by distinguishable recordings upon actuation of selected manually operable means.

10. In an apparatus for recording repeated operations of a machine, in combination, means for moving a record carrier sheet; recording means including a stylus for recording on the moving record carrier sheet; operating means including electromagnetic means adapted to be energized under the control of the machine upon each machine operation, and a mechanism connected with said recording means and operated by said electromagnetic means for stepwise moving said stylus so as to produce a record on the record carrier sheet representing the number of machine operations; control means connected to said recording means for actuating the same and including another electromagnetic means, and a mechanism controlled by said other electromagnetic means and connected with said recording means, a set of control switches, and drive means for actuating said control switches at different frequencies for producing distinguishable recordings; and a set of selectively manually operable switches respectively connected in series with said control switches so that the recording made to represent the number of machine operations is interrupted by distinguishable recordings upon actuation of selected manually operable switches.

References Cited by the Examiner

UNITED STATES PATENTS

| 892,292 | 6/08 | McLaughlin | 346—33 |
| 1,098,932 | 6/14 | Akimoff | 73—391 |
| 1,322,148 | 11/19 | Sprague | 346—62 |
| 1,480,734 | 1/24 | Nelson | 346—139 |
| 2,006,882 | 7/35 | Cleveland et al. | 346—36 |
| 2,034,943 | 3/36 | Dyer | 274—10 |
| 2,684,279 | 7/54 | Imm | 346—123 |
| 2,684,280 | 7/54 | Opocensky et al. | 346—123 |

LEYLAND M. MARTIN, *Primary Examiner.*